(12) United States Patent
Watanabe

(10) Patent No.: US 10,293,766 B2
(45) Date of Patent: May 21, 2019

(54) ELECTRICAL PARKING BRAKE DEVICE

(71) Applicant: NIDEC ELESYS CORPORATION, Kawasaki-shi, Kanagawa (JP)

(72) Inventor: Yutaka Watanabe, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 158 days.

(21) Appl. No.: 15/251,004

(22) Filed: Aug. 30, 2016

(65) Prior Publication Data
US 2017/0059040 A1  Mar. 2, 2017

(30) Foreign Application Priority Data

Aug. 31, 2015 (JP) .................. 2015-170979
Jun. 28, 2016 (JP) .................. 2016-127191
Aug. 29, 2016 (JP) .................. 2016-166868

(51) Int. Cl.
| *B60R 16/03* | (2006.01) |
| *H01H 1/00* | (2006.01) |
| *F16H 61/12* | (2010.01) |
| *F16H 63/48* | (2006.01) |
| *H01H 23/30* | (2006.01) |
| *H01H 9/00* | (2006.01) |

(52) U.S. Cl.
CPC .............. *B60R 16/03* (2013.01); *F16H 61/12* (2013.01); *F16H 63/483* (2013.01); *H01H 1/0015* (2013.01); *H01H 23/30* (2013.01); *H01H 2001/0005* (2013.01); *H01H 2009/0083* (2013.01); *H01H 2300/052* (2013.01)

(58) Field of Classification Search
CPC ..................................... B60R 16/03
USPC ........................................... 307/9.1
See application file for complete search history.

(56) References Cited

U.S. PATENT DOCUMENTS 8,432,060 B2    4/2013  Grieser-Schmitz et al.
2004/0113489 A1*  6/2004  Iwagawa ............ B60T 7/107
                                                303/155

(Continued)

FOREIGN PATENT DOCUMENTS

EP        1447830 A1 *  8/2004  ............. B40T 7/107
JP      2010-512277 A     4/2010

(Continued)

Primary Examiner — Adi Amrany
(74) Attorney, Agent, or Firm — Keating & Bennett, LLP

(57) ABSTRACT

An electrical parking brake device includes an operation switch and a control circuit. The operation switch includes a switch button, miniature switches, operation switch terminals and inside conductors, the switch button being in one of an On state, an Off state and a neutral state, the miniature switches operating in conjunction with the state of the switch button. The control circuit includes control circuit terminals, a switch verification circuit, management circuitry and brake application command circuitry, the management circuitry managing the electrical parking brake device. The operation switch defines closed circuits that are independent in terms of a pair of the operation switch terminals, for each of the operating states. The closed circuits are closed circuits that, when one or more of the miniature switches fail, avoids influence of the failure, by the miniature switches other than the one or more failing miniature switches.

10 Claims, 7 Drawing Sheets

(56) References Cited

U.S. PATENT DOCUMENTS

2009/0090610 A1\* 4/2009 Grimm .................. B60T 7/085
200/520
2016/0268075 A1\* 9/2016 Yamaguchi ............ H01H 23/02

FOREIGN PATENT DOCUMENTS

JP          2014-104880 A      6/2014
JP           2017024507 A   \*  2/2017

\* cited by examiner

ELECTRICAL PARKING BRAKE DEVICE

BACKGROUND OF THE INVENTION

1. Field of the Invention

The present invention relates to an electrical parking brake device, and more specifically, relates to an electrical parking brake device including a parking brake that is applied and released by electrical drive.

2. Description of the Related Art

An electrical parking brake device, typically, is constituted by an operation switch and a control circuit or an Electronic Control Unit (ECU). The operation switch keeps the state of whether to apply a parking brake, based on the operation by a driver. The control circuit checks the state of the operation switch, and based on this, issues an application command, a release command or the like for the brake of a vehicle. The operation switch and the control circuit, typically, are connected by a plurality of signal wires. Such an electrical parking brake device has a deep relation with the safety of the vehicle, and therefore, a secure application control based on fail-safe and the like is required even when a failure occurs in the operation switch. In addition, the number of components mounted in the interior of the vehicle has increased because of the recent demand for vehicle performance advance and the like. Therefore, it is required that the structure of the operation switch and the control circuit is a simple and space-saving structure.

As described in Japanese Translation of PCT International Application Publication No. 2010-512277, there is a conventional electrical parking brake device in which a malfunction diagnosis unit, a power source line and a ground line are provided in the operation switch in addition to switches, and five conductors are provided between the operation switch and the control circuit. Further, as described in Japanese Patent Laid-Open No. 2014-104880, there is proposed another conventional electrical parking brake device in which a switch control circuit (SWECU) is provided between the operation switch and the control circuit, and the switch control circuit and the control circuit are connected by a CAN communication line. Furthermore, as described in U.S. Pat. No. 8,432,060, another conventional electrical parking brake device actualizes a compact structure in which outside wires to be connected with the operation switch are only four conductors between the operation switch and the control circuit, but the operation switch is constituted by switches and diodes.

Here, in the electrical parking brake device in Japanese Translation of PCT International Application Publication No. 2010-512277, the internal structure of the operation switch is complicated, and in addition, the operation switch, which is connected with a power source line, a ground line and five signal wires, is complicated. Further, in the electrical parking brake device in Japanese Patent Laid-Open No. 2014-104880, the operation switch and the control circuit are connected by only a CAN communication line, allowing for simplification. However, the operation switch is provided with the switch control circuit, and in the switch control circuit, it is necessary to perform CAN communication interface processing, in addition to the check of the state of whether to apply the parking brake, resulting in complication. Furthermore, in the electrical parking brake device in U.S. Pat. No. 8,432,060, current direction limiting elements such as diodes are added in the operation switch.

SUMMARY OF THE INVENTION

In a preferred embodiment of the present invention, an electrical parking brake device includes an operation switch and a control circuit. The operation switch includes at least a switch button, a plurality of miniature switches, a plurality of operation switch terminals, and inside conductors, the switch button being put into one of three states of an On state (Apply), an Off state (Release), and a neutral state, the plurality of miniature switches operating in conjunction with the state of the switch button, the operation switch having three operating states of an On state, an Off state and a neutral state with configuration of the switch button, the miniature switches, the operation switch terminals and the inside conductors. The control circuit includes at least control circuit terminals, a switch verification circuit, management circuitry and brake application command circuitry, the management circuitry managing the electrical parking brake device. The operation switch terminals and the control circuit terminals are connected by outside conductors. The operation switch includes a circuit in which the operation switch terminals are connected with only the plurality of miniature switches by the inside conductors, and defines a plurality of closed circuits that are mutually independent in terms of a pair of the operation switch terminals, for each of the three operating states. The plurality of closed circuits are provided in the operation switch as closed circuits such that, even when one or more of the plurality of miniature switches fail, the plurality of closed circuits avoid influence of the failure due to the miniature switches other than the failing one or more miniature switches still providing an electrical connection. The management circuitry detects that the operation switch is in one of the three operating states of the switch button and a failure state.

Here, the "connection with only the miniature switches" refers to a relationship of components other than the miniature switches, for example, components such as diodes and resistors are not connected as internal circuit components of the operation switch. Further, the "inside conductor" of the operation switch refers to a conductor that is provided in the interior of the operation switch, and the "outside conductor" refers to a conductor that connects the operation switch and the control circuit. Then, by adopting a redundant structure as the configuration of the miniature switches, the failure rate of the operation switch is reduced.

In a preferred embodiment of the present invention, the number of the operation switch terminals is preferably four, and the number of the outside conductors is preferably four, for example.

When the redundant structure is adopted as the configuration of the miniature switches, the structure is complicated. By actualizing this with the minimum configuration, the miniaturization and the simplification are actualized, and the reduction in failure risk is further actualized.

Further, in a preferred embodiment of the present invention, the miniature switches of the operation switch are preferably defined by five miniature switches, for example. The operation switch defines two closed circuits that are independent in terms of two operation switch terminals selected from the four operation switch terminals, for each of the three operating states. Thus, the switch verification circuit detects that the operation switch is at least in one of the three operating states and the failure state, even when one of the five miniature switches fails.

By adopting at least a double structure as the configuration of the closed circuit including the miniature switches, the failure rate of the whole of the operation switch is reduced.

Further, in a preferred embodiment of the present invention, the switch verification circuit detects that the operation switch is in one of the three operating states and the failure state, by checking each of the outside conductors in one of three states, the three states being a state in which pull-up is performed, a state in which pull-down is performed and a state in which neither the pull-up nor the pull-down is performed.

Thus, the check in the switch verification circuit is simplified, allowing for a quick and secure check.

Further, in a preferred embodiment of the present invention, the outside conductors connected with the operation switch terminals and the switch verification circuit are defined by only signal wires. Here, the phrase "only the signal wires" refers to power supply lines such as a power source line and a ground line are not included.

Thus, the internal structure of the operation switch is simplified, and the failure rate is reduced. As a result, it is possible to achieve also the miniaturization and the cost reduction.

Further, in a preferred embodiment of the present invention, the miniature switches of the operation switch are change-over switches.

Here, as described later, the change-over switch is a switch that has three terminals a, b, c and that connects the terminal a and the terminal b at the time of the Off state and connects the terminal a and the terminal c at the time of the On state. By using the change-over switch, it is possible to efficiently provide the independent closed circuits that are formed in the operation switch. Then, it is possible to simplify the internal structure of the operation switch. As a result, it is possible to achieve the reduction in failure rate, the miniaturization, and the cost reduction.

Further, in a preferred embodiment of the present invention, at least two miniature switches of the five miniature switches operate when the switch button is in the On state (Apply), and at least two other miniature switches operate when the switch button is in the Off state (Release).

By adopting a configuration that is simplest in the relation with the switch button, it is possible to achieve the reduction in failure rate, the miniaturization, and the cost reduction.

Further, in a preferred embodiment of the present invention, the management circuitry stores formation information about closed circuits that are connected with only the plurality of miniature switches by the inside conductors in terms of the operation switch terminals, in each state, whenever the switch button changes among the three states. The management circuitry detects the current state of the switch button, based on the formation information about the closed circuits in the current state of the switch button and the formation information about the closed circuits in the next state of the switch button, in a case where one or more of the plurality of miniature switches fail and where the management circuitry cannot detect that the operation switch is in one of the three operating states of the switch button and the failure state.

Thus, even when the management circuitry determines that the current state of the switch button is the failure state because of the failure of one miniature switch, the failure is able to be recovered from and the normal operation is ensured because of the formation information of the closed circuits in the next state of the switch button. Thus, it is possible to achieve the reduction in failure rate.

The failure of the electrical parking brake device frequently occurs at contact portions and movable portions of the miniature switches. According to a preferred embodiment of the present invention, the failure rate of the device is reduced, by adopting a redundant structure for the circuit including the miniature switches. Further, a redundant structure complicates the internal structure. By realizing this with the minimum configuration, the miniaturization and the simplification are achieved, and the reduction in failure risk is achieved. Further, the minimum configuration contributes to the reduction in manufacturing cost.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings. Here, the present invention is not limited to the following preferred embodiments.

Figure 1:
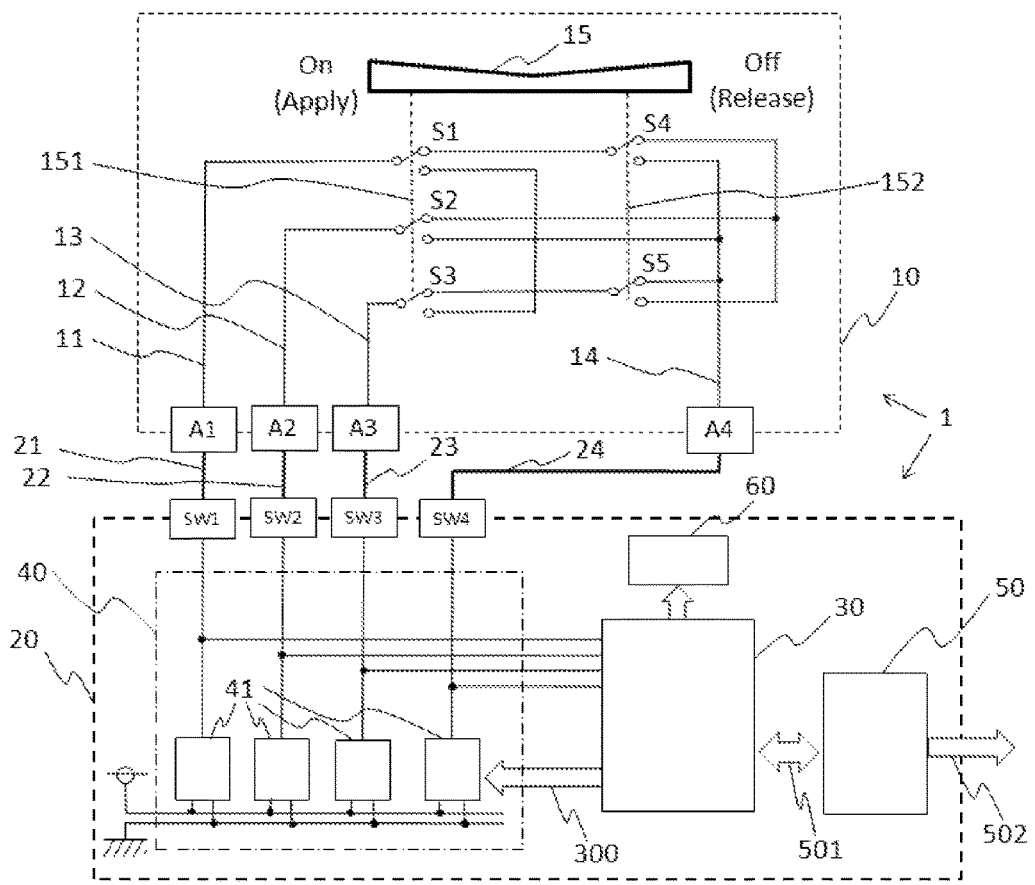
FIG. 1 is a diagram showing the internal configuration of an electrical parking brake device according to a preferred embodiment of the present invention.

FIG. 1 shows the internal configuration of an electrical parking brake device. An electrical parking brake device 1 includes at least an operation switch 10 and a control circuit 20.

The operation switch 10 preferably includes a switch button 15 that is operated by a driver, a plurality of miniature switches S1 to S5 that operate in conjunction with the state of the switch button, operation switch terminals A1 to A4, and inside conductors that include conductors 11 to 14. As a result of the operation of the switch button 15, in the case of being not in a failure state, the operation switch 10 is put into one of three operating states of an On state (Apply), an Off state (Release) and a neutral state (Neutral).

On the other hand, the control circuit 20 includes control circuit terminals B1 to B4, a switch verification circuit 40, management circuitry (such as, for example, Parking Brake Control circuitry defined by a CPU and memory or defined by an integrated circuit or other discrete circuit components) 30 that manages the parking brake device, and brake application command circuitry (such as, for example, Parking Brake Operation Control circuitry defined by a CPU and memory or defined by an integrated circuit or other discrete circuit components) 50, and in the present preferred embodiment, further includes an operating state display 60. The switch verification circuit 40 and the management circuitry 30 electrically detects closed circuits that are provided in the interior of the operation switch 10 and that are independent in terms of two of the operation switch terminals A1 to A4. In the present preferred embodiment, operation circuits 41 change the electrical states of the operation switch terminals that are electrically connected with the operation circuits 41. Then, the management circuitry 30 verifies the electrical state after the change, so that the formation state of closed circuits is confirmed. Thus, the operation switch 10 detects one of the three normal operating states and the failure state. For informing the driver of the detected operating state of the operation switch 10, the management circuitry 30 displays the operating state on the operating state display 60. Further, the command 501 of a brake operation corresponding to the operating state is sent to the brake application command circuitry 50. The brake application command circuitry 50, after receiving the command, issues an operating command 502 to a brake (not specifically illustrated in the Drawings, but which receives the operating command 502) of an object vehicle. Thus, the operation of the application/release of the parking brake is actualized.

The operation switch terminals A1 to A4 and the control circuit terminals B1 to B4 are connected by outside conductors 21 to 24 between the operation switch 10 and the control circuit 20, and thus, the electrical states of the operation switch terminals A1 to A4 are transmitted to the control circuit 20 side.

Figure 2:
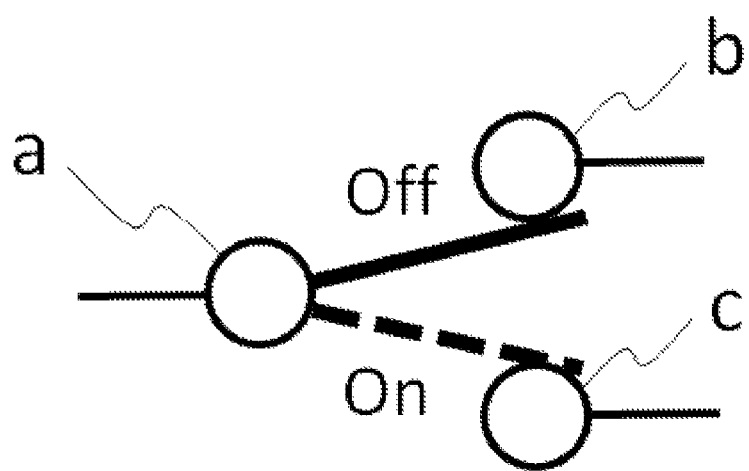
FIG. 2 a diagram showing the configuration of a change-over switch that is used as a miniature switch in a preferred embodiment of the present invention.

First, the configuration of the operation switch 10 will be described in detail. Typically, the On or Off operation of the switch button 15 is performed by the driver. When the driver pushes the switch button 15 to an On (Apply) or Off (Release) side and thereafter releases it, the switch button 15 transitions to the neutral state by an internal spring mechanism or the like. The pushing state is sustained for a certain amount of time (hereinafter, the sustained time is referred to as the "pushing time"), for example, for at least about 0.2 seconds, while the On or Off state is kept. Thereafter, the switch button 15 transitions to the neutral state, and becomes stable in this state. The miniature switches S1 to S5 have a structure called a change-over switch. This is shown in FIG. 2. The change-over switch is a switch that has three terminals a, b, c and that connects the terminal a and the terminal b at the time of the Off state and connects the terminal a and the terminal c at the time of the On state.

When the driver puts the switch button 15 into the On state (i.e., the Brake Apply state), in conjunction with this, the miniature switches S1 to S3 become the On state. This conjunction relation is shown by a broken line 151 in FIG. 1. On the other hand, when the driver puts the switch button 15 into the Off state (i.e., the Brake Release state), in conjunction with this, the miniature switches S4 to S5 become the On state. This conjunction relation is shown by a broken line 152 in FIG. 1. The On state of the miniature switches transitions to the Off state, after the elapse of a certain amount of time.

The operation switch terminals A1 to A4 and the miniature switches S1 to S5 are connected by only inside conductors in the operation switch 10, without including diodes, resistors or the like that are other components. That is, the operation switch 10 includes a circuit in which the operation switch terminals A1 to A4 are connected with only the plurality of miniature switches S1 to S5 by the inside conductors. Thus, the configuration of the internal circuit of the operation switch is simplified. As a result, the circuit provided in the operation switch 10 is miniaturized, spots for soldering or the like are decreased, and the arrangement of conductors is simplified, resulting in the reduction of the failure rate of the operation switch 10. In addition, it is possible to achieve the miniaturization, the manufacture facilitation and the cost reduction.

The circuit provided in the interior of the operation switch 10 defines two closed circuits that are independent in terms of the operation switch terminals A1 to A4, for each of the neutral state, the On state (Brake Apply) and the Off state (Brake Release), which are the three operating states of the operation switch 10. Next, the closed circuits will be described with reference to FIG. 3 to FIG. 5.

Figure 3:
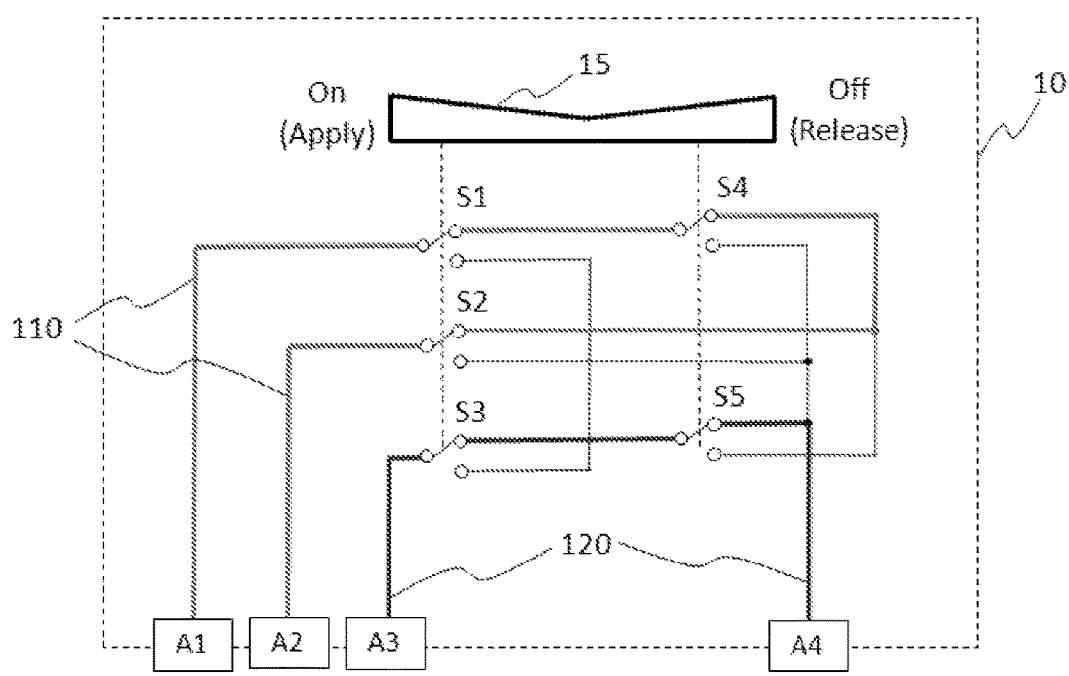
FIG. 3 is a diagram showing the circuit configuration of an operation switch at the time of a neutral state in a preferred embodiment of the present invention.

FIG. 3 shows the internal circuit when the operation switch 10 is in the neutral state. In the neutral state, the miniature switches S1 to S5 are all in the Off state. That is, in the change-over switch shown in FIG. 2, the terminal a and the terminal b are in the conducting state. At this time, in the operation switch 10, two closed circuits of a first closed circuit "A1, S1, S4, S2, A2" 110 and a second closed circuit "A3, S3, S5, A4" 120 are mutually independent. Then, there will be discussed the case where one of the miniature switches S1 to S5 is in a "failure in the Off state by which the terminal a and the terminal b are always in the non-conducting state" (hereinafter, referred to as an "Off-state disconnection failure"), for example, in the change-over switch shown in FIG. 2. In this case, if the other miniature switches except the failing miniature switch are normal, one of the first closed circuit and the second closed circuit is in the conducting state. Therefore, this is electrically detected by the switch verification circuit 40 described later, and thus, it is possible to detect the proper operating state of the operation switch 10.

In this case, even when two or more miniature switches fail, if they are miniature switches included in only one of the first closed circuit 110 and the second closed circuit 120, the other closed circuit is in the conducting state, and it is possible to detect the proper operating state of the operation switch 10. In this sense, in the present preferred embodiment of the present invention, when one of the miniature switches is in the "Off-state disconnection failure", it is possible to surely detect the proper operating state of the operation switch 10. Further, even when two or more miniature switches included in only one of the two closed circuits are in the "Off-state disconnection failure", it is possible to detect the proper operating state of the operation switch 10. Accordingly, the switch verification circuit 40 described later can detect the proper operating state of the operation switch 10, even when one or more of the plurality of miniature switches S1 to S5 fail.

Figure 4:
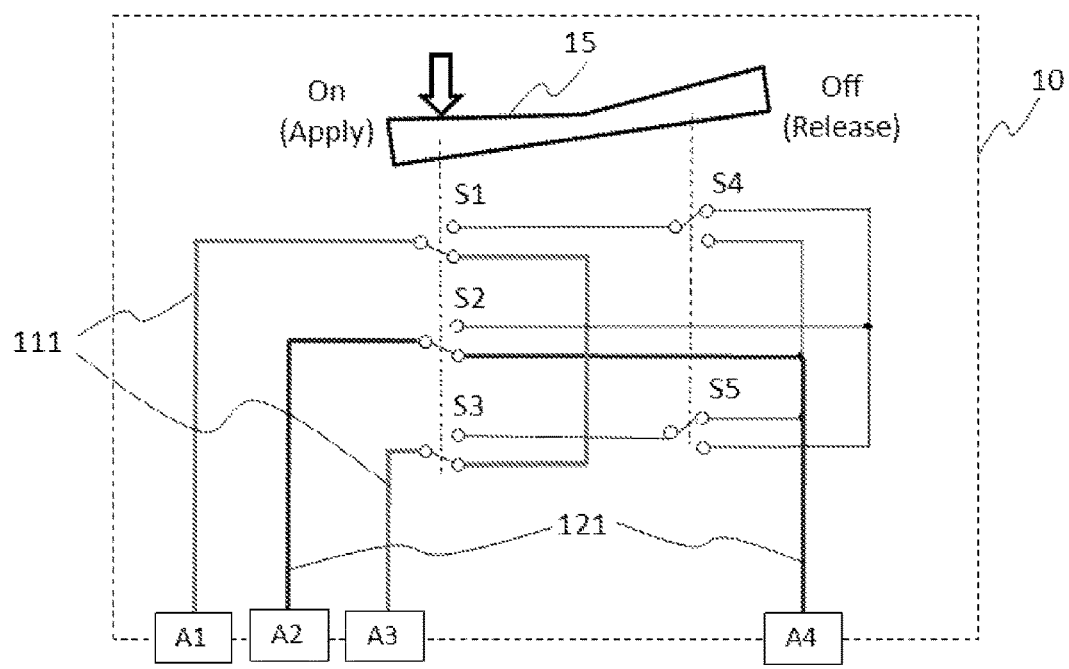
FIG. 4 is a diagram showing the circuit configuration of the operation switch at the time of an On state in a preferred embodiment of the present invention.

Next, the case where the operation switch 10 is in the On state will be described. FIG. 4 shows the internal circuit when the operation switch 10 is in the On state. In the On state, the miniature switches S1 to S3 are all in the On state, and the miniature switches S4, S5 are in the Off state. At this time, in the operation switch 10, two closed circuits of a first closed circuit "A1, S1, S3, A3" 111 and a second closed circuit "A2, S2, A4" 121 are provided. Then, there will be discussed the case where one of the miniature switches S1 to S3 is in a "failure in the On state by which the terminal a and the terminal c are always in the non-conducting state" (hereinafter, referred to as an "On-state disconnection failure"), in the change-over switch shown in FIG. 2, or one of the miniature switches S4, S5 is in the "Off-state disconnection failure". In this case, if the other miniature switches except the one failing miniature switch are normal, one of the first closed circuit 111 and the second closed circuit 121 is in the conducting state. Therefore, this is electrically detected by the switch verification circuit 40 described later, and thus, it is possible to detect the proper operating state of the operation switch 10.

In this case, even when the two miniature switches S1, S3 included in the first closed circuit 111 both fail, it is possible to detect the proper operating state of the operation switch 10, because the second closed circuit 121 is in the conducting state.

Figure 5:
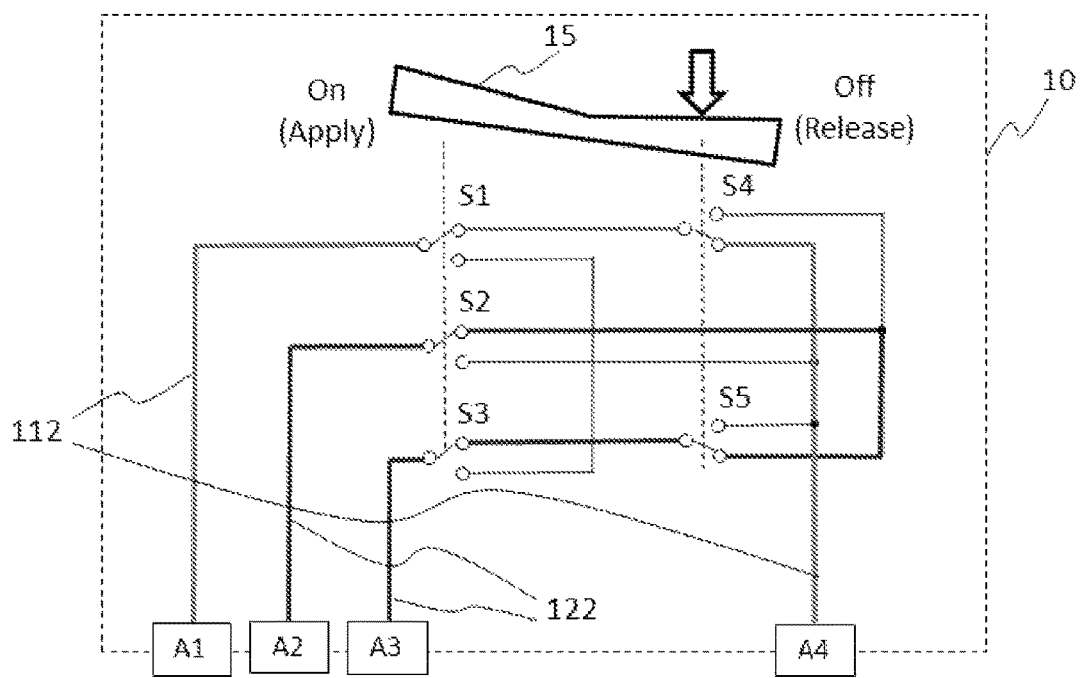
FIG. 5 is a diagram showing the circuit configuration of the operation switch at the time of an Off state in a preferred embodiment of the present invention.

Next, the case where the operation switch 10 is in the Off state will be described. FIG. 5 shows the internal circuit when the operation switch 10 is in the Off state (Release state). In the Release state, the miniature switches S1 to S3 are all in the Off state, and the miniature switches S4, S5 are in the On state. At this time, in the operation switch 10, two closed circuits of a first closed circuit "A1, S1, S4, A4" 112 and a second closed circuit "A2, S2, S5, S3, A3" 122 are provided.

Then, there will be discussed the case where one of the miniature switches S1 to S3 is in the "Off-state disconnection failure" or one of the miniature switches S4, S5 is in the "On-state disconnection failure". In this case, if the other miniature switches except the one failing miniature switch are normal, one of the first closed circuit 112 and the second closed circuit 122 will be in the conducting state. Therefore, this is electrically detected by the switch verification circuit 40 described later, and thus, it is possible to detect the proper operating state of the operation switch 10.

In this case, as in the case where "the operation switch is in the neutral state", even when two or more miniature switches fail, if they are miniature switches included in only one of the first closed circuit 112 and the second closed circuit 122, the other closed circuit is in the conducting state, and it is possible to detect the proper operating state of the operation switch 10.

In the present preferred embodiment of the present invention described above, the specific circuit configuration of the operation switch 10 has been shown, to facilitate understanding of the features of the present invention. Various preferred embodiments of the present invention is based on the internal configuration of the operation switch 10 with only the plurality of miniature switches and the conductors and the formation of two closed circuits that are independent in terms of two terminals of the operation switch terminals A1 to A4. Then, even in the case of the failure of at least one miniature switch, the operating state of the operation switch is properly detected by confirming that one independent closed circuit normally operates.

As preferred embodiments for actualizing this, there are many preferred embodiments other than the above specifically discussed preferred embodiment. The whole redundancy of the operation switch against the failure increases, as the number of the miniature switches increases. Thus, it is possible to reduce the failure rate of the operation switch. Further, the miniature switch may be defined by a switch that includes two terminals and that performs merely the On/Off operation, instead of the change-over switch shown in FIG. 2.

The management circuitry 30 sends an instruction 300 to the switch verification circuit 40, and thus, electrically confirms that at least one closed circuit that is independent in terms of two terminals of the operation switch terminals A1 to A4 is provided in the interior of the operation switch 10. The management circuitry 30 detects which of the four operating states is the operating state of the operation switch 10, based on the state of the closed circuit. In the following, the electrical confirmation operation will be described.

Figure 6:
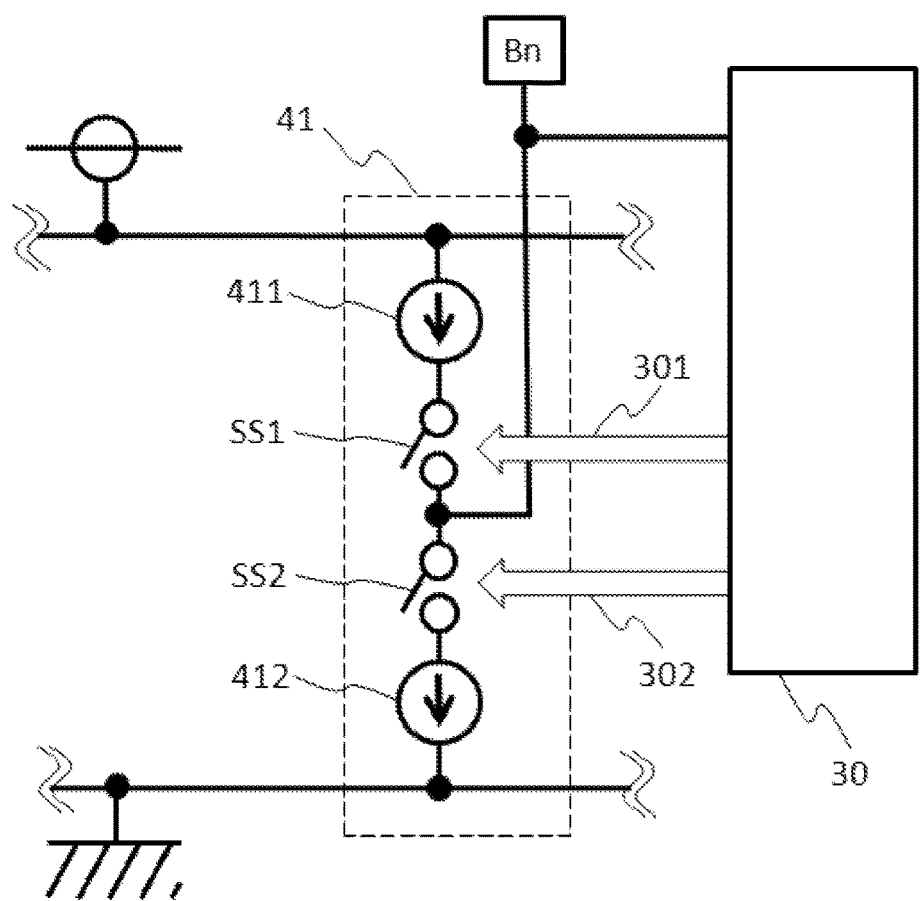
FIG. 6 is a diagram exemplifying the internal configuration of an operation circuit that is included in a switch verification circuit in a preferred embodiment of the present invention.

FIG. 6 is a diagram exemplifying the internal configuration of an operation circuit that is included in the switch verification circuit. In the figure, reference character Bn denotes one of the control circuit terminals B1 to B4 representatively, and reference character n denotes an integer of 1 to 4. The portion surrounded by the broken line shows an operation circuit 41, and this corresponds to the operation circuit 41 in the interior of the switch verification circuit 40 in FIG. 1. The operation circuit 41 is preferably defined by two constant current sources 411, 412 and two switches SS1, SS2. Here, the constant current source schematically shows a function to roughly equalize the potentials of both ends by applying a constant current. Then, the potential difference between both ends of the constant current source is a value that is sufficiently negligible compared to the power source voltage. The function of the constant current source can be actualized in various manners by publicly known technologies. Further, the two switches are turned On/Off through inside wires 301, 302 of the control circuit, by the instruction from the management circuitry 30. Here, the two switches are not put into the On state simultaneously.

Therefore, when only the switch SS1 is turned On, the Bn terminal has a High level that is the power source potential (hereinafter, the potential is referred to as "VH"). On the other hand, when only the switch SS2 is turned On, the Bn terminal has a Low level that is the ground potential (hereinafter, the potential is referred to as "VL"). The management circuitry 30 appropriately turns On the switches SS1, SS2 for each of the four operation circuits 41, and thus, operates the potentials of the control circuit terminals B1 to B4, to one of VH, VL and an unconnected state in which the control circuit terminal does not have any of these potentials (hereinafter, referred to as an "Open state"). Thus, it is possible to control the potentials of the operation switch terminals A1 to A4 and to recognize the states of the closed circuits formed in the operation switch 10.

When the driver pushes the switch button 15 to the On (Apply) or Off (Release) side and thereafter releases it, the switch button 15 transitions to the neutral state by an internal spring mechanism. The time (pushing time) during which the driver is pushing the switch button is, for example, at least about 0.2 seconds. During this time, in conjunction with the switch button operation, the miniature switches S1 to S5 perform the On/Off operation. The management circuitry 30 continuously monitors the electrical states of the control circuit terminals B1 to B4, and detects that the switch button 15 has been pushed by the driver, when the electrical states change. In the following, the operation will be described specifically.

First, in a state in which the switch button is not pushed, the operation switch 10 is in the neutral state. At this time, the two closed circuits 110, 120 shown in FIG. 3 are provided in the operation switch 10. For example, through the operation circuits 41, the management circuitry 30 operates (B1, B2, B3, B4) to the states of (VH, Open, Open, Open), respectively. Then, the management circuitry 30 checks the electrical states of (B2, B3, B4), and confirms that only B2 has VH. Thus, it is confirmed that the closed circuit 110 is properly defined. Next, for example, through the operation circuits 41, the management circuitry 30 operates (B1, B2, B3, B4) to the states of (Open, Open, VH, Open), respectively. Then, the management circuitry 30 checks the electrical states of (B1, B2, B4), and confirms that only B4 has VH. Thus, it is confirmed that the closed circuit 120 is properly defined. By repeating the above two confirmation operations, the management circuitry 30 recognizes that the operation switch 10 is in the neutral state. The operation of repeatedly confirming the neutral state is referred to as the "neutral idling operation", hereinafter.

Next, for example, when the driver pushes the switch button 15 to the On (Brake Apply) or Off (Brake Release) side, the closed circuit check in the neutral idling operation detects that the switch button 15 is not in the neutral state. At the point of time, the management circuitry 30 recognizes that the switch button 15 has been pushed, and after waiting for the pushing state to become electrically stable, checks each closed circuit formation state shown in FIG. 4 and FIG. 5, through the operation circuits 41, in order to detect to which side the switch button 15 is has been pushed. The state in which the switch button 15 is pushed is sustained for the pressing time (for example, at least 0.2 seconds), and therefore, the check only needs to be completed in this time. In the case where the driver pushes the switch button 15 for a long time, the pressing time becomes longer. Therefore, the management circuitry 30 needs to monitor when the pushing time ends and the switch button 15 transitions to the neutral state. The monitoring operation is able to be realized by performing a repetitive operation that is similar to the neutral idling operation. That is, when the switch button 15 is in the On state (Brake Apply), the management circuitry 30 confirms that the two independent closed circuits 111, 121 shown in FIG. 4 are continuously provided. Then, when the state changes, the pushing time is regarded to end. Thereafter, it is only necessary to confirm the closed circuits in FIG. 3, which are the closed circuits in the neutral state. The same goes for the case where the switch button 15 is in the Off state (Brake Release).

As described above, in preferred embodiments of the present invention, based on the operation history of the driver to the operation switch 10, the operating state of the electrical parking brake device 1 is held, and a secure and safe parking brake operation is actualized. On that occasion, even when a failure occurs in some of the miniature switches S1 to S5 of the operation switch 10, the failure is recovered, and the normal operation is ensured. The two mutually independent closed circuits shown in FIG. 3 to FIG. 5 are provided corresponding to the three normal operating states of the operation switch 10, and in the case where one of the closed circuits is independently provided, the proper operating state is brought. Then, in the case of being in a state other than the proper state, a process of, for example, informing the driver of the failure is performed.

In preferred embodiments of the present invention, when the driver pushes the switch button 15 and thereafter releases it, the switch button 15 returns to the neutral state by the action of a spring or the like. For example, suppose that the management circuitry 30 recognizes the failure state during the pushing time after the driver pushes the switch button 15, although the internal state of the operation switch 10 is normal in the neutral state. This is because the judgment in the failure check of the operation switch 10 in the pushing state is performed by only the states of the two independent closed circuits in FIG. 4 or FIG. 5 that are provided in the pushing time. In the usual failure check, the detection is able to be almost completed by the first-stage check. However, if the failure state is recognized, as a second-stage check step, the closed circuit state is checked also in the neutral state, which surely occurs before or after the failure state, and the verification is performed along with the current closed circuit state that is the failure state. Thus, it is possible to detect, in a certain range, which of the miniature switches S1 to S5 fails, and what the failure is, for example, which of the Off-state disconnection failure, the On-state disconnection failure, an Off-state conduction failure, an On-state conduction failure and the like the failure is. Here, the Off-state conduction failure is a "failure in the Off state by which the terminal a and the terminal b are always in the conducting state" in FIG. 2, and the On-state conduction failure is a "failure in the On state by which the terminal a and the terminal c are always in the conducting state" in FIG. 2. By using the concept, it is possible to detect the proper operating state of the operation switch 10, even when a plurality of miniature switches fail. Thus, it is possible to actualize a safe electrical parking brake device that further reduces the failure rate. In the following, the operation will be described specifically.

Figure 7:
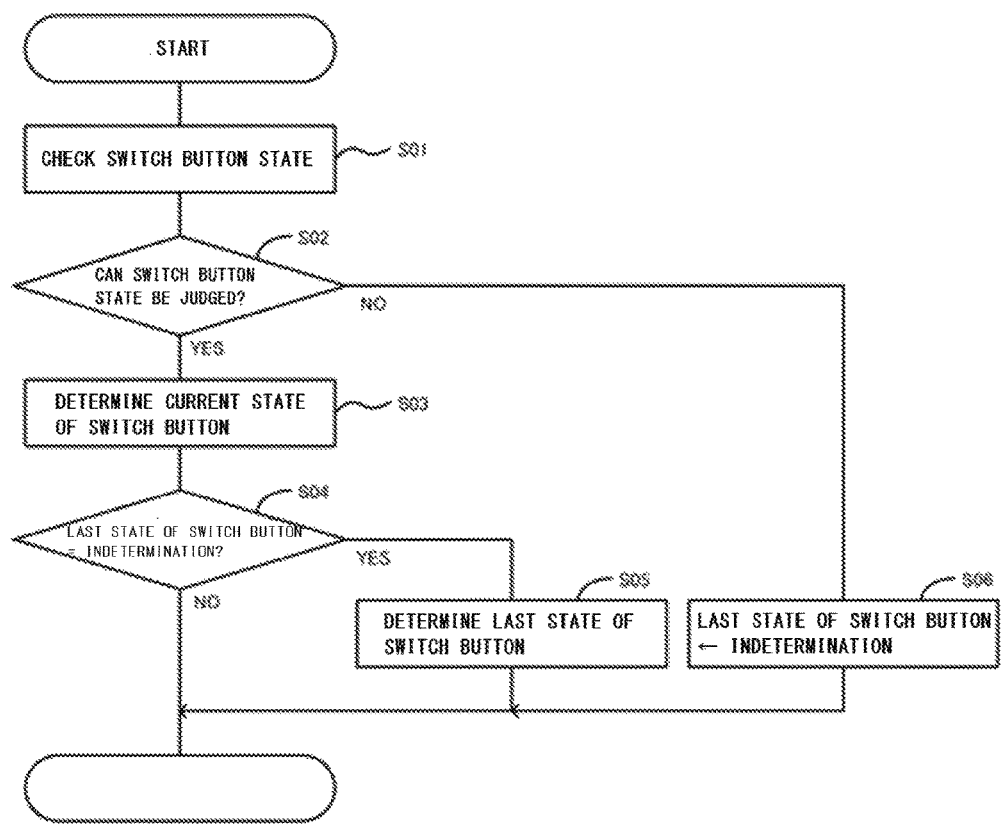
FIG. 7 is a flowchart showing a schematic procedure of judging the operating state of the operation switch in a preferred embodiment of the present invention.

FIG. 7 shows a schematic procedure in which the management circuitry 30 determines the operating state of the switch button 15. The procedure of FIG. 7 is preferably repeatedly executed with a constant period of about 10 milliseconds, for example. First, in step S01, the switch button state is checked. Subsequently, in step S02, the switch button state is determined, and in the case where it can be determined that the switch button state is one of the three states of the neutral state, the On state and the Off state, the procedure proceeds to step S03. If it cannot be determined that the switch button is in one of the three states in step S02, the procedure proceeds to step S06, and the information that the state of the switch button cannot be determined is stored. The specific example will be described later.

In step S03, it is determined which of the neutral state, the On state and the Off state the switch button state is. Subsequently, in step S04, it is determined whether the switch button state before this switching of the switch button is the failure state, and in the case of the failure state, the procedure proceeds to step S05. Then, in step S05, the last state of the switch button is determined by using the current state of the switch button.

In the following, a specific example of the case where the switch button state cannot be determined will be shown.

For example, in the case where the switch button is in the neutral state in FIG. 3, the miniature switches S1 to S5 are all in the Off state. Therefore, in the neutral state, the Off-state conduction failure of the miniature switches S1 to S5 cannot be detected. However, in the case where the switch button is in the On state in FIG. 4, the Off-state conduction failure of the miniature switches S1 to S3 can be detected. Further, in the case where the switch button is in the Off state in FIG. 5, the Off-state conduction failure of the miniature switches S4 to S5 can be detected.

If the miniature switch S3 is in the Off-state conduction failure in FIG. 4, the two proper closed circuits are not defined even when the switch button is turned On. As one circuit, the circuit "A2, S2, A4" is defined. As the other circuit, the circuit "A1, S1, S3, A3" is not defined, and instead, a circuit "A3, S3, S5, A4" is defined. These two circuits are circuits that commonly have the operation switch terminal A4. Here, the one circuit "A2, S2, A4" is a circuit in which the switch button is recognized to be in the On state, and the other circuit "A3, S3, S5, A4" is a circuit in which the switch button is recognized to be in the neutral state. Therefore, in this state, it cannot be determined whether the switch button is in the On state or in the neutral state. The management circuitry 30 stores this failure state. After that, the switch button surely becomes the neutral state. Then, the two proper closed circuits of "A1, S1, S4, S2, A2" 110 and "A3, S3, S5, A4" 120 are recognized. Since the switch button is in the neutral state at this time, it is able to be determined that the previously stored state is not the neutral state but the On state.

Further, if the miniature switch S2 is in the On-state conduction failure in FIG. 3, the two proper closed circuits are not defined even when the switch button is in the neutral state. As one circuit, the circuit "A3, S3, S5, A4" is defined. As the other circuit, the circuit "A1, S1, S4, S2, A2" is not defined, and instead, a circuit "A2, S2, A4" is defined. These two circuits are circuits that commonly have the operation switch terminal A4. Here, the one circuit "A3, S3, S5, A4" is a circuit in which the switch button is recognized to be in the neutral state, and the other circuit "A2, S2, A4" is a circuit in which the switch button is recognized to be in the On state. Therefore, in this state, it cannot be determined whether the switch button is in the neutral state or in the On state. The management circuitry 30 stores this failure state. After that, when the switch button becomes the On state, the two proper closed circuits of "A1, S1, S3, A3" 111 and "A2, S2, A4" 121 are recognized. Since the switch button is in the On state at this time, it is able to be determined that the previously stored state is not the On state but the neutral state.

In the case of the failure of another miniature switch, similarly, the closed circuit state is checked in the neutral state, which surely occurs before or after the failure state, and the verification is performed along with the current closed circuit state that is the failure state. Thus, it is possible to actualize a safe electrical parking brake device that further reduces the failure rate.

According to preferred embodiments of the present invention, it is possible to provide a small and low-cost electrical parking brake device that reduces the failure rate of the operation switch to be operated by the driver of the vehicle. The electrical parking brake device according to preferred embodiments of the present invention is suitably used in vehicles including four-wheeled vehicles, for example.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrical parking brake device comprising:
    an operation switch including at least a switch button, five change-over switches, four operation switch terminals, and inside conductors, the switch button being put into one of three states of an On state, an Off state, and a neutral state, the plurality of change-over switches operating in conjunction with the one of the three states of the switch button, the operation switch having three operating states of an On state, an Off state, and a neutral state which control configured states of the switch button, the change-over switches, the operation switch terminals, and the inside conductors; and
    a control circuit including at least control circuit terminals, a switch verification circuit, management circuitry, and brake application command circuitry, the management circuitry managing the electrical parking brake device; wherein
    when the switch button is operated, change-over terminals of each of the change-over switches are respectively connected to either: one of the operation switch terminals, or another change-over terminal;
    the operation switch terminals and the control circuit terminals are connected by four outside conductors;
    the operation switch includes a circuit in which the operation switch terminals are connected with only the plurality of change-over switches by the inside conductors, and providing a plurality of closed circuits for each of the three operating states that are mutually independent;
    the plurality of closed circuits are provided in the operation switch as closed circuits such that operations of ones of the plurality of closed circuits are not influenced by a failure of one or more of the change-over switches in other ones of the plurality of closed circuits;
    the management circuitry detects that the operation switch is in one of the three operating states of the switch button and if a failure state is present;
    the operation switch includes two independent closed circuits which do not simultaneously share any same terminals, the two independent closed circuits being defined for each and every one of the three operating states of the switch button and using all four of the operation switch terminals and respective ones of the change-over switches; and
    the switch verification circuit detects that the operation switch is at least in one of the three operating states of the switch button and the failure state even when one of the change-over switches fails.

2. The electrical parking brake device according to claim 1, wherein the switch verification circuit detects that the operation switch is in one of the three operating states of the switch button and the failure state, by checking each of the outside conductors in one of three states;
    the three states are a state in which pull-up to a power source potential is performed, a state in which pull-down to a ground potential is performed, and a state in which neither the pull-up nor the pull-down is performed; and
    the switch button is operable by a user to switch between the three operating states.

3. The electrical parking brake device according to claim 2, wherein the outside conductors connected with the operation switch terminals and the switch verification circuit are defined by only signal wires.

4. The electrical parking brake device according to claim 3, wherein
    the management circuitry stores formation information about closed circuits that are connected with only the plurality of miniature switches by the inside conductors in terms of the operation switch terminals, in each of the three states of the switch button, whenever the switch button changes among the three states of the switch button; and
    when one or more of the plurality of change-over switches fail and the management circuitry cannot detect that the operation switch is in one of the three operating states of the switch button and the failure state, the management circuitry detects a previous state of the switch button, by comparing the formation information about the closed circuits in a previous one of the three states of the switch button and the formation information about the closed circuits in a current one of the three states of the switch button.

5. The electrical parking brake device according to claim 2, wherein
    the management circuitry stores formation information about closed circuits that are connected with only the plurality of miniature switches by the inside conductors in terms of the operation switch terminals, in each of the three states of the switch button, whenever the switch button changes among the three states of the switch button; and when one or more of the plurality of change-over switches fail and the management circuitry cannot detect that the operation switch is in one of the three operating states of the switch button and the failure state, the management circuitry detects a previous state of the switch button, by comparing the formation information about the closed circuits in a previous one of the three states of the switch button and the formation information about the closed circuits in a current one of the three states of the switch button.

6. The electrical parking brake device according to claim 1, wherein the outside conductors connected with the operation switch terminals and the switch verification circuit are defined by only signal wires.

7. The electrical parking brake device according to claim 6, wherein the management circuitry stores formation information about closed circuits that are connected with only the plurality of miniature switches by the inside conductors in terms of the operation switch terminals, in each of the three states of the switch button, whenever the switch button changes among the three states of the switch button; and when one or more of the plurality of change-over switches fail and the management circuitry cannot detect that the operation switch is in one of the three operating states of the switch button and the failure state, the management circuitry detects a previous state of the switch button, by comparing the formation information about the closed circuits in a previous one of the three states of the switch button and the formation information about the closed circuits in a current one of the three states of the switch button.

8. The electrical parking brake device according to claim 1, wherein at least two change-over switches of the five change-over switches operate when the switch button is in the On state, and at least two other change-over switches operate when the switch button is in the Off state.

9. The electrical parking brake device according to claim 8, wherein the management circuitry stores formation information about closed circuits that are connected with only the plurality of miniature switches by the inside conductors in terms of the operation switch terminals, in each of the three states of the switch button, whenever the switch button changes among the three states of the switch button; and when one or more of the plurality of change-over switches fail and the management circuitry cannot detect that the operation switch is in one of the three operating states of the switch button and the failure state, the management circuitry detects a previous state of the switch button, by comparing the formation information about the closed circuits in a previous one of the three states of the switch button and the formation information about the closed circuits in a current one of the three states of the switch button.

10. The electrical parking brake device according to claim 1, wherein the management circuitry stores formation information about closed circuits that are connected with only the plurality of miniature switches by the inside conductors in terms of the operation switch terminals, in each of the three states of the switch button, whenever the switch button changes among the three states of the switch button; and when one or more of the plurality of change-over switches fail and the management circuitry cannot detect that the operation switch is in one of the three operating states of the switch button and the failure state, the management circuitry detects a previous state of the switch button, by comparing the formation information about the closed circuits in a previous one of the three states of the switch button and the formation information about the closed circuits in a current one of the three states of the switch button.

* * * * *